United States Patent
Gregory et al.

(12) 
(10) Patent No.: US 6,293,667 B1
(45) Date of Patent: Sep. 25, 2001

(54) PROCESS FOR PRODUCING AN IMAGE ON A SUBSTRATE

(75) Inventors: Peter Gregory; John Reginald Provost, both of Blackley (GB)

(73) Assignee: Zeneca Limited, London (GB)

(*) Notice: Subject to any disclaimer, the term of this patent is extended or adjusted under 35 U.S.C. 154(b) by 0 days.

(21) Appl. No.: 09/165,130

(22) Filed: Oct. 2, 1998

(30) Foreign Application Priority Data

Oct. 24, 1997 (GB) .................................................. 9722395

(51) Int. Cl.[7] .......................................................... B41J 2/17
(52) U.S. Cl. ............................................ 347/96; 347/100
(58) Field of Search ................................ 106/224, 31.45, 106/31.43; 347/96; 524/547

(56) References Cited

U.S. PATENT DOCUMENTS

| | | | |
|---|---|---|---|
| 4,445,970 | * 5/1984 | Post et al. | 162/135 |
| 4,770,934 | 9/1988 | Yamasaki et al. | 428/331 |
| 4,849,770 | 7/1989 | Koike et al. | 357/100 |
| 5,213,873 | 5/1993 | Yasuda et al. | 428/195 |
| 5,409,529 | * 4/1995 | Nagashima et al. | 106/22 H |
| 5,541,002 | 7/1996 | Hosoi et al. | 428/537.5 |
| 5,542,972 | * 8/1996 | von der Eltz et al. | 106/22 H |
| 5,589,277 | 12/1996 | Malhotra | 428/500 |
| 5,736,606 | * 4/1998 | Yanagi et al. | 524/547 |

FOREIGN PATENT DOCUMENTS

| | | |
|---|---|---|
| 0418792 | 3/1991 | (EP) . |
| 2184742 | 7/1987 | (GB) . |
| 4183759 | 6/1992 | (JP) . |
| 4183760 | 6/1992 | (JP) . |
| 4183761 | 6/1992 | (JP) . |
| 7228809 | 8/1995 | (JP) . |
| 8302256 | 11/1996 | (JP) . |
| 9228293 | 9/1997 | (JP) . |

* cited by examiner

*Primary Examiner*—John Barlow
*Assistant Examiner*—Manish S. Shah
(74) *Attorney, Agent, or Firm*—Rothwell, Figg, Ernst & Manbeck

(57) ABSTRACT

A process for producing an image on a substrate comprising printing an ink onto the substrate, characterized in that the ink contains a reactive dye, the substrate is an acid paper and the printing is performed by an ink jet printer. Also claimed is an acid paper printed by means of the process.

16 Claims, No Drawings

PROCESS FOR PRODUCING AN IMAGE ON A SUBSTRATE

This invention relates to, an ink jet printing ("IJP") process and to acid papers printed with a reactive dye.

There are many demanding performance requirements for images formed by IJP. Ideally such images are sharp and have good water-fastness, light-fastness and optical density. The requirement for high light-fastness is particularly important for images used on outdoor posters and bill boards because these are exposed to direct sunlight for long periods of time.

Reactive dyes are known in the textile field for the exhaust dyeing of cotton, jute, hemp, flax and the like. In this dyeing process the reactive dye is applied in conjunction with alkali and salt at a temperature of about 80° C.

We have now found that images formed by printing reactive dyes onto acid papers have good light fastness, particularly when compared to the same dyes printed onto other papers.

According to the present invention there is provided a process for producing an image on a substrate comprising printing an ink onto the substrate, characterised in that the ink contains a reactive dye the substrat is an acid paper and the printing is performed by an ink jet printer.

Preferred reactive dyes comprise one or more chromophore and one or more cellulose reactive groups.

Preferred chromophores are azo (preferably monoazo and disazo), anthraquinone, triphenodioxazine, formazan and phthalocyanine chromophores. Preferred cellulose reactive groups are halotriazine groups, especially chloro- or fluoro-triazine groups, vinylsulphone or sulphatoethylsulphone groups and halopyrimidine groups. More preferably the cellulose reactive groups are selected from chlorotriazine, fluoro-triazine, fluoro-pyrimidine and chloro-pyrimidine groups, especially chloro-triazines.

Especially preferred reactive dyes comprise one or more azo, anthraquinone, triphendioxazine, formazan or phthalocyanine chromophore and one or more chlorotriazine group.

Suitable examples of reactive dyes include all those listed in the Colour Index International. More specifically, preferred examples of reactive dyes include C.I. Reactive Red 1, 3, 3:1, 13, 24, 29, 31, 43, 45, 58, 74, 85, 120, 125, 141, 151, 152, 185, 188, 190 and 204; C.I. Reactive Violet 1, 2, 3, 24, 35, 36 and 38; C.I. Reactive Yellow 3, 18, 36, 45, 56, 80, 81, 84, 85, 95, 135, 136 139, 142, 145 and 157; C.I. Reactive Black 8, 10, 45 and 31; C.I. Reactive Blue 1, 2, 5, 7, 15, 41, 47, 49, 67, 71, 75, 99, 168, 171, 233 and 291; and C.I. Reactive Orange 4, 12, 13, 20, 35, 38, 46, 66, 73, 95 and 99.

It is especially preferred that the reactive dye is a dye of the Formula (1) to (13) as described on pages 2 to 12 of WO 98/29513 which are incorporated herein by reference thereto.

The reactive dye used in the ink has preferably been purified by removal of substantially all of the inorganic salts and by-products resulting from its synthesis. Such purification assists in the preparation of a low viscosity aqueous solution suitable for use in an ink jet printer. The dyes may be purified using conventional techniques, for example reverse osmosis, dialysis, ultrafiltration or a combination thereof.

The ink used in the process preferably comprises:
(a) from 0.01 to 30 parts in total of one or more reactive dye(s); and
(b) from 70 to 99.99 parts of a liquid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Examples of further suitable ink media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

The ink preferably has a concentration of less than 100 parts per million, more preferably less than 50 parts per million, in total of halide ions and divalent and trivalent metals. This reduces nozzle blockage in ink jet printing heads, particularly in thermal ink jet printers.

The ink jet printer preferably applies the ink to the acid paper in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the acid paper during relative movement between the acid paper and the orifice. In piezoelectric ink jet printers the oscillation of a small crystal causes ejection of the ink from the orifice.

The acid paper is preferably a paper having an acidic coating or, more preferably, a paper which is inherently acidic. Papers which are inherently acidic preferably contain acidic organic and/or inorganic components.

When the acid paper is a paper having an acidic coating the coating preferably comprises a polymeric material containing an acidic organic or inorganic component.

A preferred acidic inorganic component is alum, silica, kaolin, talc or titanium dioxide, especially alum. Preferred acidic organic components include organic compounds having at least one carboxylic, sulphonic or phosphoric acid group, especially monomeric amino acids, monomeric hydroxy acids, monomeric polycarboxylic acids, and mixtures thereof. Examples of suitable acidic organic components are given in U.S. Pat. No. 5,589,277, column 12, line 11 to column 22, line 63 which is incorporated herein by reference thereto.

The polymeric material used in the coating on the paper is preferably polyvinyl alcohol, PVP, carboxy methyl cellulose, starch or hydroxy ethyl cellulose.

A preferred class of inherently acidic papers are rosin sized papers.

A suitable test for determining the acidity of a paper is by measuring the pH of a cold- or hot-water extract by the test ASTM D778.

The acid paper preferably has a pH of from 3 to 6.9, more preferably 3.5 to 6.5, especially 3.9 to 6.1.

The acid paper preferably has a thickness of from 50 to 500 microns, more preferably 100 to 125 microns.

In view of the foregoing preferences particularly preferred papers are rosin sized, have a pH of from 3.9 to 6.1 and a thickness of 100 to 125 microns.

Examples of commercially available acid papers include Xerox 4024™ acid paper, Gilbert Bond, HP Premium and HP Glossy. It is especially preferred that the paper is Xerox 4024™ acid paper.

A second aspect of the present invention provides an acid paper printed with a reactive dye, preferably by means of a process according to the first aspect of the present invention.

A third aspect of the present invention provides a printer comprising paper, an ink cartridge containing an ink, and a means for ink jet printing the ink onto the paper, wherein the ink contains a reactive dye and the paper is an acid paper.

The invention is further illustrated by the following Examples in which all parts and percentages are by weight unless otherwise stated.

EXAMPLE 1

Ink Jet Printing onto Paper Substrates

Inks were printed onto each of the papers shown in Tables A, B and C using a Hewlett Packard HP-560 ink jet printer.

Each ink contained the % by weight of the reactive dye shown in the table in a mixture of water (90 parts) and diethylene glycol (10 parts). After ink jet printing the colourimetric data for each print was measured using a CIE ANLAB Colorimeter. The L, a, b, c and H values are shown in each Table.

The following reactive dyes were used:

Dye (1)=a dye of the formula:

Dye (1)

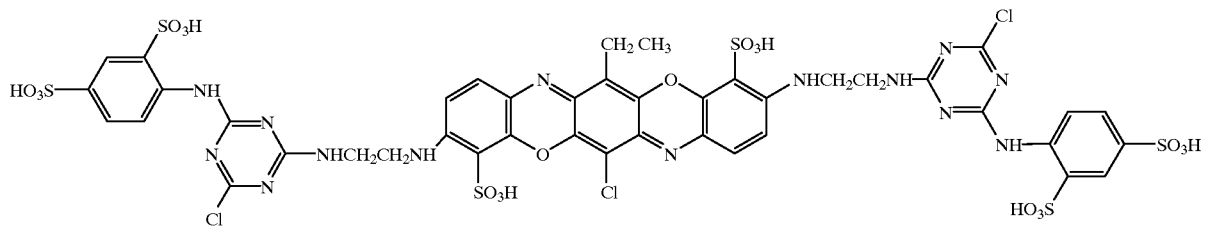

Dye (1) was prepared using the method described in Example 1 of EP-A-576 123

Dye (2)=C.I. Reactive Red 3:1

Dye (3)=C.I. Reactive Orange 13

Dye (4)=an approximately 1:1 mixture of dyes of the formula:

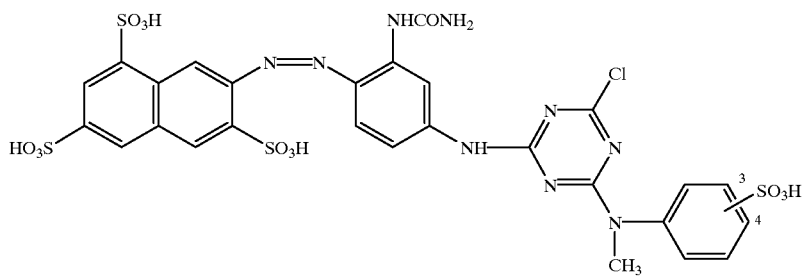

Dye (4)

Dye (4) was prepared using the method described in Example 6 of EP-A-559 331

Dye (5)=C.I. Reactive Blue 71

Dye (6)=a dye of the formula:

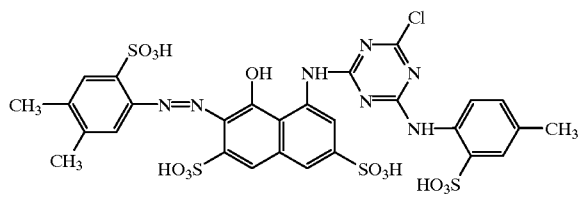

Dye (6)

Dye (6) was prepared using the method described in example 19 of EP-A-692 003

Dye (7)=C.I. Reactive Yellow 85

Dye (8)=Procion Black PX-2R

Dye (9)=C.I. Reactive Black 8

The following papers were used:

Xerox 4024™ Acid Paper, available from Xerox Inc.
Wiggins Conqueror, available from Wiggins Teape Ltd
SEC Glossy*, available from Seiko Epson Corp. and
Schoeller coated paper*, available from Schoeller Digital Imaging Gmbh.

*=Comparative (not an acid paper).

The light-fastness of each print was measured using an Altas Weatherometer after exposure to light for 50 hours. The light fastness results are shown in the column marked LF in Table C. A low value in the LF column represents a print with a high light-fastness.

The optical density of each print is shown in Table C, in the column marked 'OD'. This was measured using an X-Rite Spectrodensitometer.

In Table C the prints on the acidic papers, Xerox 4024™ Acid paper and Wiggins Conqueror are shown in bold. The results clearly show that the light-fastness of the prints on the acidic papers is significantly higher that that obtained on the comparative papers.

TABLE A

| Dye | Paper | % Dye | L | a | b | c | H |
|---|---|---|---|---|---|---|---|
| Dye (5) | SEC Glossy | 0.75 | 59.97 | −27.23 | −47.57 | 54.81 | 240.21 |
| Dye (5) | Schoeller coated | " | 61.13 | −29.34 | −44.34 | 53.17 | 236.5 |
| Dye (5) | Xerox acid | " | 61.8 | −26.24 | −39.33 | 47.27 | 236.28 |
| Dye (5) | Wiggins conq. | " | 63.54 | −25.51 | −37.03 | 44.97 | 235.43 |
| Dye (5) | SEC Glossy | 1.5 | 50.06 | −19.59 | −51.63 | 55.23 | 249.23 |
| Dye (5) | Schoeller coated | " | 53.87 | −23.74 | −48.79 | 54.25 | 244.06 |
| Dye (5) | Xerox acid | " | 51.3 | −19.91 | −43.55 | 47.89 | 245.43 |
| Dye (5) | Wiggins conq. | " | 56.75 | −21.34 | −39.6 | 44.99 | 241.68 |
| Dye (6) | SEC Glossy | 0.6 | 54.12 | 76.25 | −9.44 | 76.83 | 352.94 |
| Dye (6) | Schoeller coated | " | 53.66 | 73.27 | −13.34 | 74.47 | 349.68 |
| Dye (6) | Xerox acid | " | 53.9 | 67.64 | −10.29 | 68.41 | 351.35 |
| Dye (6) | Wiggins conq. | " | 54.45 | 67.28 | −7.84 | 67.73 | 353.35 |
| Dye (6) | SEC Glossy | 1.5 | 48.56 | 78.4 | 0.41 | 78.41 | 0.29 |
| Dye (6) | Schoeller coated | " | 49.32 | 74.71 | −5.03 | 74.87 | 356.15 |
| Dye (6) | Xerox acid | " | 47.75 | 68.3 | −1 | 68.31 | 359.17 |
| Dye (6) | Wiggins conq. | " | 48.17 | 68 | 0.5 | 68.01 | 0.41 |
| Dye (7) | SEC Glossy | 0.75 | 94.95 | −22.25 | 68.83 | 72.33 | 107.91 |
| Dye (7) | Schoeller coated | " | 90.45 | −22.01 | 66.14 | 69.71 | 108.4 |
| Dye (7) | Xerox acid | " | 91.84 | −17.14 | 50.21 | 53.05 | 108.84 |
| Dye (7) | Wiggins conq. | " | 92.98 | −20.1 | 69.24 | 72.09 | 106.19 |
| Dye (7) | SEC Glossy | 1.5 | 94.63 | −22.86 | 86.91 | 84.07 | 105.77 |
| Dye (7) | Schoeller coated | " | 90.14 | −22.52 | 76.85 | 80.09 | 106.33 |
| Dye (7) | Xerox acid | " | 91.51 | −18.25 | 59.75 | 62.47 | 106.98 |
| Dye (7) | Wiggins conq. | " | 92.17 | −19.56 | 85.04 | 87.27 | 102.95 |
| Dye (8) | SEC Glossy | 1.5 | 21.11 | 0.37 | −18.3 | 18.31 | 271.15 |
| Dye (8) | Schoeller coated | " | 23.24 | −0.31 | −16.23 | 16.23 | 268.91 |
| Dye (8) | Xerox acid | " | 29.24 | −2.25 | −9.9 | 10.17 | 257.21 |
| Dye (8) | Wiggins conq. | " | 27.53 | −1.83 | −7.75 | 7.97 | 256.71 |
| Dye (8) | SEC Glossy | 2.5 | 13.78 | 2.55 | −15.72 | 15.93 | 279.22 |

TABLE A-continued

| Dye | Paper | % Dye | L | a | b | c | H |
|---|---|---|---|---|---|---|---|
| Dye (8) | Schoeller coated | " | 19.48 | 0.31 | −13.67 | 13.67 | 271.3 |
| Dye (8) | Xerox acid | " | 25.01 | −0.7 | 7.26 | 7.29 | 264.49 |
| Dye (8) | Wiggins conq. | " | 33.5 | −3.36 | −10.17 | 10.71 | 251.72 |
| Dye (9) | SEC Glossy | 1.5 | 21.74 | 1.28 | −17.33 | 17.37 | 274.23 |
| Dye (9) | Schoeller coated | " | 29.21 | −1.2 | −17.04 | 17.09 | 265.97 |
| Dye (9) | Xerox acid | " | 30.15 | −0.5 | −10.8 | 10.19 | 267.19 |
| Dye (9) | Wiggins conq. | " | 30.533 | −0.56 | −10.54 | 10.55 | 266.96 |
| Dye (9) | SEC Glossy | 2.5 | 12.16 | 2.33 | −15.38 | 15.55 | 278.62 |
| Dye (9) | Schoeller coated | " | 18.2 | 0.33 | −12.84 | 12.85 | 271.47 |
| Dye (9) | Xerox acid | " | 25.16 | 0.01 | −7.46 | 7.49 | 270.07 |
| Dye (9) | Wiggins conq. | " | 25.16 | 0.06 | −7 | 7.01 | 270.48 |

TABLE B

| Dye | Paper | % Dye | L | a | b | c | H |
|---|---|---|---|---|---|---|---|
| Dye (1) | SEC Glossy | 0.75 | 39.31 | 23.49 | −61.11 | 65.47 | 291.02 |
| Dye (1) | Schoeller coated | " | 42.68 | 15.35 | −55.26 | 57.35 | 285.52 |
| Dye (1) | Xerox acid | " | 40.71 | 13.43 | −48.69 | 50.15 | 285.42 |
| Dye (1) | Wiggins conq. | " | 39.44 | 16.94 | −50.96 | 53.71 | 288.38 |
| Dye (1) | SEC Glossy | 1.5 | 27.06 | 31.68 | −61.43 | 69.11 | 297.28 |
| Dye (1) | Schoeller coated | " | 32 | 25.61 | −59.4 | 64.69 | 293.32 |
| Dye (1) | Xerox acid | " | 32.6 | 17.56 | −46.49 | 49.69 | 290.69 |
| Dye (1) | Wiggins conq. | " | 31.38 | 21.2 | −48.24 | 52.69 | 293.72 |
| Dye (2) | SEC Glossy | 1 | 53.67 | 75.62 | 20.82 | 78.43 | 15.39 |
| Dye (2) | Schoeller coated | " | 54.43 | 70.43 | 12.72 | 71.57 | 10.24 |
| Dye (2) | Xerox acid | " | 53.79 | 67.62 | 16.31 | 69.55 | 13.56 |
| Dye (2) | Wiggins conq. | " | 54.21 | 67.52 | 18.39 | 69.97 | 15.23 |
| Dye (2) | SEC Glossy | 2.5 | 47.71 | 75.35 | 40.65 | 85.61 | 28.35 |
| Dye (2) | Schoeller coated | " | 48.88 | 71.37 | 27.5 | 76.49 | 21.07 |
| Dye (2) | Xerox acid | " | 48.33 | 66.44 | 25.76 | 71.25 | 21.19 |
| Dye (2) | Wiggins conq. | " | 48.66 | 66.97 | 26.75 | 72.11 | 21.77 |
| Dye (3) | SEC Glossy | 0.75 | 72.91 | 43.54 | 70.11 | 82.53 | 58.15 |
| Dye (3) | Schoeller coated | " | 70.19 | 40.07 | 67.77 | 78.73 | 59.4 |
| Dye (3) | Xerox acid | " | 69.76 | 43.39 | 55.34 | 70.33 | 51.9 |
| Dye (3) | Wiggins conq. | " | 71.49 | 43.23 | 55.8 | 70.59 | 52.23 |
| Dye (3) | SEC Glossy | 1.5 | 68.56 | 50.97 | 83.68 | 97.99 | 58.65 |
| Dye (3) | Schoeller coated | " | 67.89 | 44.13 | 74.75 | 86.81 | 59.44 |
| Dye (3) | Xerox acid | " | 65.06 | 50.27 | 63.58 | 81.05 | 51.67 |
| Dye (3) | Wiggins conq. | " | 66.11 | 51.11 | 64.8 | 82.53 | 51.74 |
| Dye (4) | SEC Glossy | 0.75 | 85.32 | 5.71 | 91.36 | 91.53 | 86.42 |
| Dye (4) | Schoeller coated | " | 82.62 | 2.28 | 80.31 | 80.35 | 88.38 |
| Dye (4) | Xerox acid | " | 82.44 | 6.55 | 77.8 | 78.07 | 85.18 |
| Dye (4) | Wiggins conq. | " | 83.22 | 8.47 | 79.56 | 80.01 | 83.92 |
| Dye (4) | SEC Glossy | 1.5 | 80.24 | 18.03 | 103.6 | 105.11 | 80.12 |
| Dye (4) | Schoeller coated | " | 78.07 | 13.75 | 91.94 | 92.97 | 81.49 |
| Dye (4) | Xerox acid | " | 78.36 | 16.01 | 84.44 | 85.95 | 79.26 |
| Dye (4) | Wiggins conq. | " | 79.42 | 17.17 | 86.16 | 87.85 | 78.73 |

TABLE C

| Dye | Paper | % Dye | OD | LF (50 hrs) |
|---|---|---|---|---|
| Dye (5) | SEC Glossy | 0.75 | 1.509 | 6.05 |
| " | Schoeller coated | " | 1.416 | 3.9 |
| " | Xerox acid | " | 1.142 | 2.71 |
| " | Wiggins conq. | " | 1.035 | 3.12 |
| Dye (5) | SEC Glossy | 1.5 | 1.922 | 5.9 |
| " | Schoeller coated | " | 1.691 | 4.24 |
| " | Xerox acid | " | 1.41 | 2.36 |
| " | Wiggins conq. | " | 1.176 | 2.42 |
| Dye (6) | SEC Glossy | 0.6 | 1.289 | 21.22 |
| " | Schoeller coated | " | 1.237 | 17.57 |
| " | Xerox acid | " | 1.101 | 4.96 |
| " | Wiggins conq. | " | 1.084 | 7.69 |
| Dye (6) | SEC Glossy | 1.5 | 1.636 | 13.67 |
| " | Schoeller coated | " | 1.454 | 17.39 |
| " | Xerox acid | " | 1.312 | 4.05 |
| " | Wiggins conq. | " | 1.287 | 5.48 |
| Dye (7) | SEC Glossy | 0.75 | 0.509 | 24.88 |
| " | Schoeller coated | " | 0.555 | 26.81 |
| " | Xerox acid | " | 0.433 | 6.45 |
| " | Wiggins conq. | " | 0.568 | 14.49 |
| Dye (7) | SEC Glossy | 1.5 | 0.622 | 17.84 |
| " | Schoeller coated | " | 0/659 | 27 |
| " | Xerox acid | " | 0.52 | 5.96 |
| " | Wiggins conq. | " | 0.748 | 14.49 |
| Dye (8) | SEC Glossy | 1.5 | 1.533 | 9.83 |
| " | Schoeller coated | " | 1.453 | 6.7 |
| " | Xerox acid | " | 1.252 | 1.96 |
| " | Wiggins conq. | " | 1.297 | 1.72 |
| Dye (8) | SEC Glossy | 2.5 | 1.811 | 4.78 |
| " | Schoeller coated | " | 1.577 | 3.99 |
| " | Xerox acid | " | 1.371 | 1.11 |
| " | Wiggins conq. | " | 1.136 | 2.4 |
| Dye (9) | SEC Glossy | 1.5 | 1.507 | 0.76 |
| " | Schoeller coated | " | 1.27 | 4.36 |
| " | Xerox acid | " | 1.223 | 0.58 |
| " | Wiggins conq. | " | 1.213 | 0.37 |
| Dye (9) | SEC Glossy | 2.5 | 1.893 | 0.99 |
| " | Schoeller coated | " | 1.628 | 0.5 |
| " | Xerox acid | " | 1.366 | 0.38 |
| " | Wiggins conq. | " | 1.365 | 0.74 |
| Dye (1) | SEC Glossy | 0.75 | 1.402 | 14.23 |
| " | Schoeller coated | " | 1.279 | 22.35 |
| " | Xerox acid | " | 1.242 | 10.8 |
| " | Wiggins conq. | " | 1.256 | 12.23 |
| Dye (1) | SEC Glossy | 1.5 | 1.884 | 14.93 |
| " | Schoeller coated | " | 1.63 | 23.55 |
| " | Xerox acid | " | 1.411 | 10.25 |
| " | Wiggins conq. | " | 1.415 | 11.55 |
| Dye (2) | SEC Glossy | 1 | 1.611 | 16.24 |
| " | Schoeller coated | " | 1.38 | 11.02 |
| " | Xerox acid | " | 1.281 | 2.96 |
| " | Wiggins conq. | " | 1.259 | 5.33 |
| Dye (2) | SEC Glossy | 2.5 | 2.003 | 10.16 |
| " | Schoeller coated | " | 1.661 | 14.56 |
| " | Xerox acid | " | 1.411 | 3.66 |
| " | Wiggins conq. | " | 1.4 | 5.02 |

TABLE C-continued

| Dye | Paper | % Dye | OD | LF (50 hrs) |
|---|---|---|---|---|
| Dye (4) | SEC Glossy | 0.75 | 1.086 | 7.84 |
| " | Schoeller coated | " | 0.991 | 8.49 |
| " | Xerox acid | " | 0.98 | 2.74 |
| " | Wiggins conq. | " | 0.989 | 3.97 |
| Dye (3) | SEC Glossy | 1.5 | 1.581 | 17.09 |
| " | Schoeller coated | " | 1.415 | 29.31 |
| " | Xerox acid. | " | 1.281 | 6.94 |
| " | Wiggins conq. | " | 1.271 | 9.62 |

What is claimed is:

1. A process for producing an image on a substrate comprising printing an ink onto the substrate, characterized in that the ink contains a reactive dye containing one or more reactive groups selected from halotriazine, vinylsulphone, sulphatoethylsulphone and halopyrimidine groups, the substrate is an acid paper and the printing is performed by an ink-jet printer.

2. A process according to claim 1 wherein the reactive dye comprises one or more azo, anthraquinone, triphendioxazine, formazan or phthalocyanine chromophores and one or more chlorotriazine groups.

3. A process according to claim 1 wherein the reactive dye has been purified by removal of substantially all of the inorganic salts and by-products resulting from it synthesis.

4. A process according to claim 1 wherein the ink comprises:
   (a) from 0.01 to 30 parts in total of one or more reactive dye(s); and
   (b) from 70 to 99.99 parts of a liquid medium;
wherein all parts are by weight and the number of parts of (a)+(b)=100.

5. A process according to claim 4 wherein component (b) of the ink comprises a mixture of water and an organic solvent.

6. A process according to claim 1 wherein the ink has a concentration of less than 100 parts per million in total of halide ions and divalent and trivalent metals.

7. A process according to claim 1 wherein the printer is a piezoelectric ink jet printer or thermal ink jet printer.

8. A process according to claim 1 wherein the acid paper is a paper which is inherently acidic or a paper having an acidic coating.

9. A process according to claim 1 wherein the acid paper has a thickness of from 50 to 500 microns.

10. A process according to claim 1, wherein the pH of the acid paper is from 3 to 6.9.

11. A process according to claim 1 wherein the acid paper is rosin sized.

12. A process according to claim 1 wherein the acid paper is rosin sized, has a pH of from 3.9 to 6.1 and a thickness of 100 to 125 microns.

13. An acid paper printed by means of the process according to either claim 1 or claim 2.

14. A printer comprising paper, an ink cartridge containing an ink, and a means for ink jet printing the ink onto the paper, wherein the ink contains a reactive dye and the paper is an acid paper.

15. A printer according to claim 14 wherein the acid paper is rosin sized.

16. A process as claimed in claim 1, wherein the reactive dye contains one or more cellulose reactive groups selected from chlorotriazine, fluorotriazine, fluoropyrimidine and chloropyrimidine groups.

* * * * *